United States Patent
Bunk et al.

[11] Patent Number: 5,548,182
[45] Date of Patent: Aug. 20, 1996

[54] REFLECTOR LAMP SPECIFICALLY ADAPTED FOR COMBINATION WITH A REFLECTOR LAMP-LAMP LUMINAIRE OR FIXTURE

[75] Inventors: Axel Bunk, Munich; Ruediger Klam, Eichstaett; Elmar Ender, Augsburg; Frank Gloeckler, Eichstaett, all of Germany

[73] Assignee: Patent-Treuhand-Gesellschaft F. Elektrische Gluehlampen mbH, Munich, Germany

[21] Appl. No.: 373,647

[22] Filed: Jan. 17, 1995

[30] Foreign Application Priority Data

Jan. 18, 1994 [DE] Germany ............ 44 01 270.5

[51] Int. Cl.⁶ .................................... H01K 1/32
[52] U.S. Cl. .................. 313/113; 313/112; 313/580
[58] Field of Search .................. 313/110, 111, 313/112, 113, 579, 580

[56] References Cited

U.S. PATENT DOCUMENTS

| | | |
|---|---|---|
| 4,249,101 | 2/1981 | Walsh . |
| 4,663,557 | 5/1987 | Martin et al. . |
| 4,721,877 | 1/1988 | Kawakatsu et al. . |
| 4,869,927 | 9/1989 | Kawakatsu et al. . |
| 4,942,331 | 7/1990 | Bergman et al. ............ 313/579 |
| 5,138,219 | 8/1992 | Krisl et al. . |
| 5,177,396 | 1/1993 | Gielen et al. ............ 313/580 |
| 5,179,468 | 1/1993 | Gasloli . |

FOREIGN PATENT DOCUMENTS

| | | |
|---|---|---|
| 0361674A1 | 4/1990 | European Pat. Off. . |
| 0460913A2 | 12/1991 | European Pat. Off. . |
| 0470496A2 | 2/1992 | European Pat. Off. . |
| 0590602A1 | 4/1994 | European Pat. Off. . |

*Primary Examiner*—Nimeshkumar D. Patel
*Attorney, Agent, or Firm*—Frishauf, Holtz, Goodman, Langer & Chick, P.C.

[57] ABSTRACT

To reduce heat loading of a luminaire or lamp fixture in which a halogen incandescent lamp, retained in a reflector, is installed, the bulb of the halogen incandescent lamp is coated with a heat reflecting or mirror coating so that heat radiated from the filament (3) of the lamp (2, 10) is reflected from the surface of the bulb back into the bulb, rather than being directed from the filament to the reflector so that a portion of the radiation is diffusely transmitted from the lamp through an outer covering (6) thereof. If the reflector is only partially IR reflective, the remaining portion which can pass to heat the fixture or luminaire is small enough so that its temperature rise will be within an acceptable range. Thus, forwardly directed heat radiation is not focused, as is the visible light, and heat loading on an illuminated object is substantially reduced, without excessive heat loading of the fixture or luminaire.

20 Claims, 4 Drawing Sheets

REFLECTOR LAMP SPECIFICALLY ADAPTED FOR COMBINATION WITH A REFLECTOR LAMP-LAMP LUMINAIRE OR FIXTURE

Reference to related patents, the disclosure of which is hereby incorporated by reference:

U.S. Pat. No. 5,179,468, Gasloli
U.S. Pat. No. 5,138,219, Krisl et al
U.S. Pat. No. 4,249,101, Walsh
U.S. Pat. No. 4,721,877, Kawakatsu et al
U.S. Pat. No. 4,869,927, Kawakatsu et al, a division of U.S. Pat. No. 4,721,877
U.S. Pat. No. 4,663,557, Martin et al.
Reference to related publications:
Published European Patent Application 0 470 496 A2, Yuge et al Published European Patent Application 0 460 913 A2, Watanabe.

FIELD OF THE INVENTION

The present invention relates to a reflector lamp, and more particularly to such a reflector lamp which is especially suitable for use in a housing or lamp fixture or luminaire, in which the lamp is so constructed that it does not overheat the housing or fixture within which it may be retained, the light source itself being in form of a halogen lamp, typically a halogen incandescent lamp.

BACKGROUND

Reflector-type halogen incandescent lamps are well known, and European Published Patent Applications 0 460 913 A2, Watanabe, and 0 470 496 A2, Yuge et al, illustrate typical examples. The halogen incandescent lamps there shown have a coating which transmits visible light, but reflects infrared (IR) radiation into the interior of the lamp. Such coatings are also known as a warm or hot-light mirror. The lamp is fitted into a reflector. The reflector has a glass shell which is coated at its interior with an interference filter material, which reflects visible light, but transmits IR radiation. Such a reflector is also known as a visible light or cold-light mirror. Such lamps are particularly suitable for illuminating relatively cool objects. If this lamp is located within a lamp housing, the fixture is subject to substantial heat loading due to the cold-light mirror, which passes the IR radiation backwardly of the reflector mirror.

THE INVENTION

It is an object to so construct a reflector lamp that the heat radiation in the direction of visible light radiation is reasonable and acceptable for most uses without, however, at the same time overloading the fixture or housing of the lamp with respect to heating thereof.

Briefly, the light source or lamp is so constructed that infrared radiation from the bulb is diffusely emitted therefrom; and the reflector reflects both visible light as well as a portion, preferably a substantial proportion of infrared radiation.

In accordance with the invention, therefore, the emitted infrared radiation towards the rear of the lamp, that is, through the reflecting mirror, is only a minor portion of the infrared radiation; the infrared radiation is emitted in the direction of the visible light but, before being so emitted, is so influenced that it is radiated in a diffuse manner, rather than in the directional pattern resulting from the reflector located to reflect the visible radiation in a predetermined manner and direction. Consequently, only the visible, needed radiation is projected by the reflector; the unfocused, diffuse infrared radiation is uniformly distributed from the lamp.

In accordance with a preferred feature of the invention, a light emitting filament, for example, is so located with respect to the reflector that it is axially positioned within the reflector axis, so that the proportion of direct radiation which leaves the reflector, without deflection therefrom, is minimized. It is readily possible to shield the end of the bulb of the light source or, for example, to use any one of the well known coatings, for example a metal oxide as described in Published European Patent Application 0 460 913 A2, Watanabe. It is not necessary that the filament be axially located; transversely positioned filaments are also suitable.

In accordance with the invention, so constructing the lamp that it has means which cause diffusion of infrared radiation from the light source without, however, modifying the visible radiation, results in an overall construction in which the lamp functions, as before, as a source of visible radiation; its undesirable feature, namely a source of infrared (IR) radiation, is then not the filament as such but, rather, the entire bulb within which it is retained. The outer dimensions of the bulb are not matched to the directional characteristics of the reflector, and are much larger than the filament itself.

The diffuse radiation of the IR portion can be obtained, in accordance with a preferred feature of the invention, by using a customary interference coating which acts as a warm-light reflector or mirror. The radiation edge between the region of high transmission—that is, visible light having a wave length of between about 400–800 nm—and a range of high reflection, that is, infrared radiation having a wave length longer than about 800 nm, is preferably in the range of between 700–900 nm. The high reflectivity of the coating results in multiple reflection paths of the IR radiation within the bulb itself so that, for purposes of IR radiation, the entire bulb forms the radiation source therefor, rather than only the filament placed essentially in a focal position of the reflector.

Various types of coatings can be used.

EXAMPLE 1

A plurality of coatings, that is, a stack of coatings, alternatingly with a high and low index of refraction, are formed. These coatings include, for example, $TiO_2$, $Ta_2O_5$ or $Nb_2O_5$, and $SiO_2$, $MgF_2$ respectively. Such coatings are described, for example, in the referenced U.S. Pat. Nos. 5,179,468, Gasloli, or 5,138,219, Krisl et al. Depending on the dimension of the stack of the respective coatings, these coatings can be used as cold-light mirrors as well as warm-light mirrors or, also, as wide-band mirrors—see U.S. Pat. No. 4,663,557, Martin et al.

EXAMPLE 2

As an alternative to the coatings of Example 1, coatings on a basis of metal, for example silver, can be used; such coatings are selectively infrared-reflective. Reference is made to U.S. Pat. No. 4,249,101, Walsh, with respect to such coatings, which may include silver, gold, aluminum, and the alkali metals. This patent also discloses a coating of two layers of metal, such as silver, sandwiching a dielectric material therebetween to form an etalon coating.

EXAMPLE 3

As another alternative to the above examples, coatings which contain organometallic compounds which form bubbles may be used. These bubbles have IR radiation diffusing or dispersing effect, see U.S. Pat. Nos. 4,721,877 and 4,869,972, Kawakatsu et al (to which European Specification 0 176 345 B1 corresponds).

EXAMPLE 4

IR absorbing layers may be used which re-radiate the absorbed heat; such layers may, for example, be thin gold layers.

Basically, the invention is directed to the feature that the lamp bulb is supplied with a means which causes diffuse radiation of the IR radiation component from the surface of the bulb of the lamp. The above four examples give suitable coatings.

The diffuse or unfocused emitted IR radiation permits use of a reflector which acts as a broad band mirror, reflecting visible light as well as a substantial portion of the IR radiation. Consequently, it reflects at least the portion of the IR radiation in a wave length of between about 800 and 1200 nm, adjacent a visible light band since, in this wave length, the emission of radiation from the incandescent lamp is the maximum. The selection of the cut-off or edge of reflection permits optimum balancing of heat loading in the direction of the emitted radiation, that is, towards the opening of the reflector, and backwardly, that is, back of the reflector towards the lamp base, and hence towards a lamp housing, or fixture, or luminaire.

A suitable reflector, which meets the requirement, is an aluminum reflector which reflects a broad band of wave lengths, and particularly well between 300 nm to more than 3000 nm. Especially suitable is a reflector cup or shell which is coated with a broad-band interference filter coating. The shell may be of glass or plastic. The short-wave reflection edge is, preferably, in the range of about 400 to 450 nm; the long-wave edge is preferably between about 1200 and 2000 nm, 1500 nm being particularly suitable. This arrangement can be more easily optimized with respect to the desired result, that is, desirably minimum thermal loading in forward direction, than an aluminum reflector, in which the transmission or reflection characteristics are essentially predetermined. A massive aluminum reflector, however, has the advantage that it is essentially insensitive with respect to mechanical damage and, especially, with respect to heat. In principle, a metal, particularly aluminum, may form a substrate which is coated with the suitable interference filter coating.

The preferred transmission of the bulb, in the visible wave length, should be better than 90%. A preferred reflection of the reflector in the range of the broad-band mirror should also be better than 90%, or 0.9. A portion of the remaining transmission may extend through the reflector, if it is partly transparent, towards the lamp fixture or housing, within which the lamp is retained. This is entirely acceptable if this remaining transmission is in the order of between about 0.5 and 2% of the overall luminous flux. In the visible radiation range, such remaining deflection provides an aesthetically pleasing appearance of the lamp unit as a whole.

Reflector lamps which are customarily used for general service illumination have power ranges between about 20 W to 100 W and even more. The reflector lamp in accordance with the present invention is particularly suitable for such power ratings and especially for use in energy-efficient lamps in which the bulb is so shaped that the light output is increased, because IR radiation is particularly effectively re-reflected to the light emitting element or body itself, thereby increasing its temperature. Generally spherical or cylindrical or ellipsoidal or similar configurations of bulb shapes for the lamp bulb are suitable.

DRAWINGS

Figure 3:
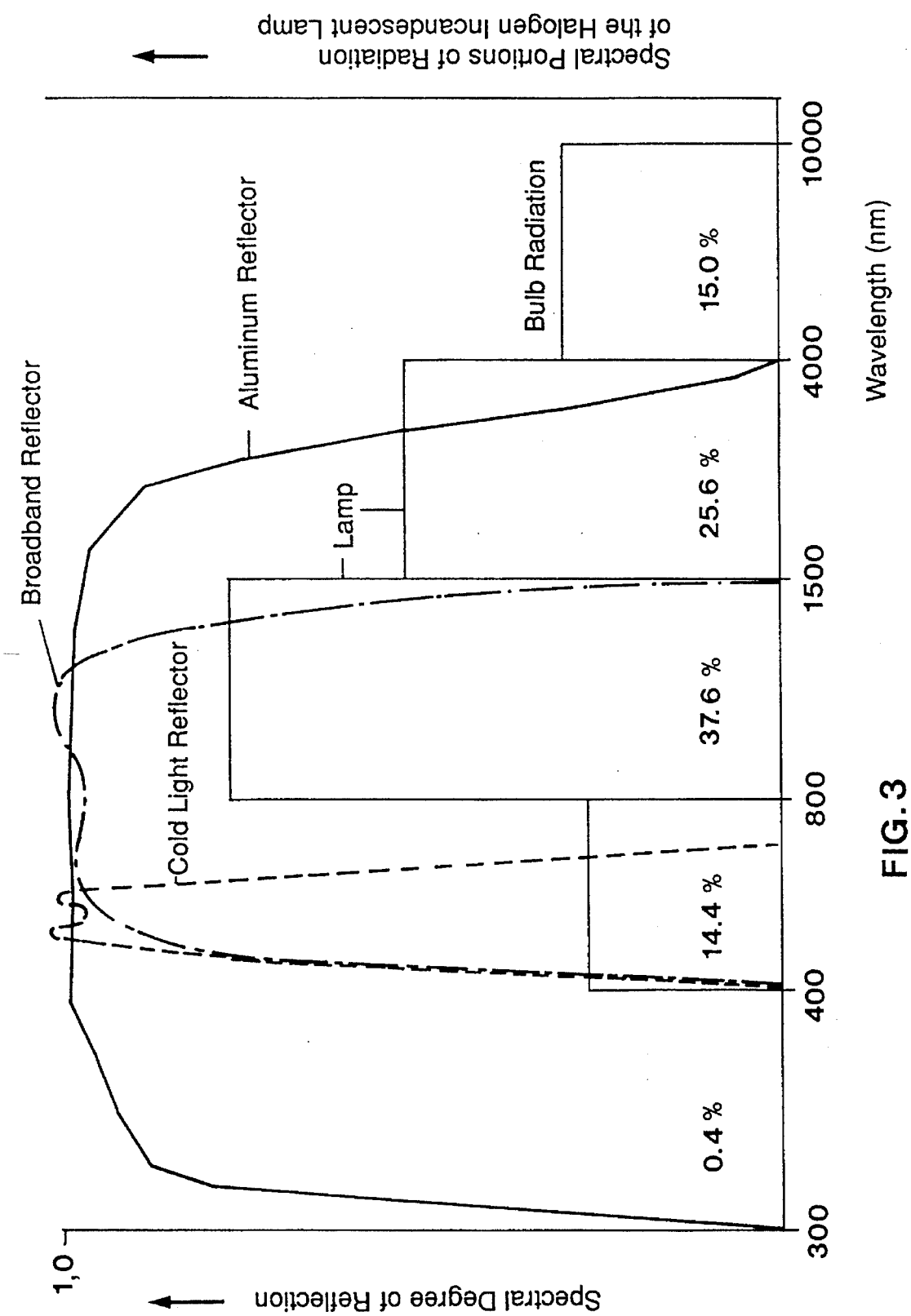

FIG. 3 is a graph of spectral reflection (ordinate) with respect to wave length, and illustrating the effects of various types of reflectors, as well as, in highly schematic form, of radiation from the lamp. Lamp radiation is also indicated, to a different scale and in percentages, on the ordinate of the graph; and FIGS. 4a to 4d are spatial distribution diagrams of radiation when using different types of reflectors.

DETAILED DESCRIPTION

Figure 1:
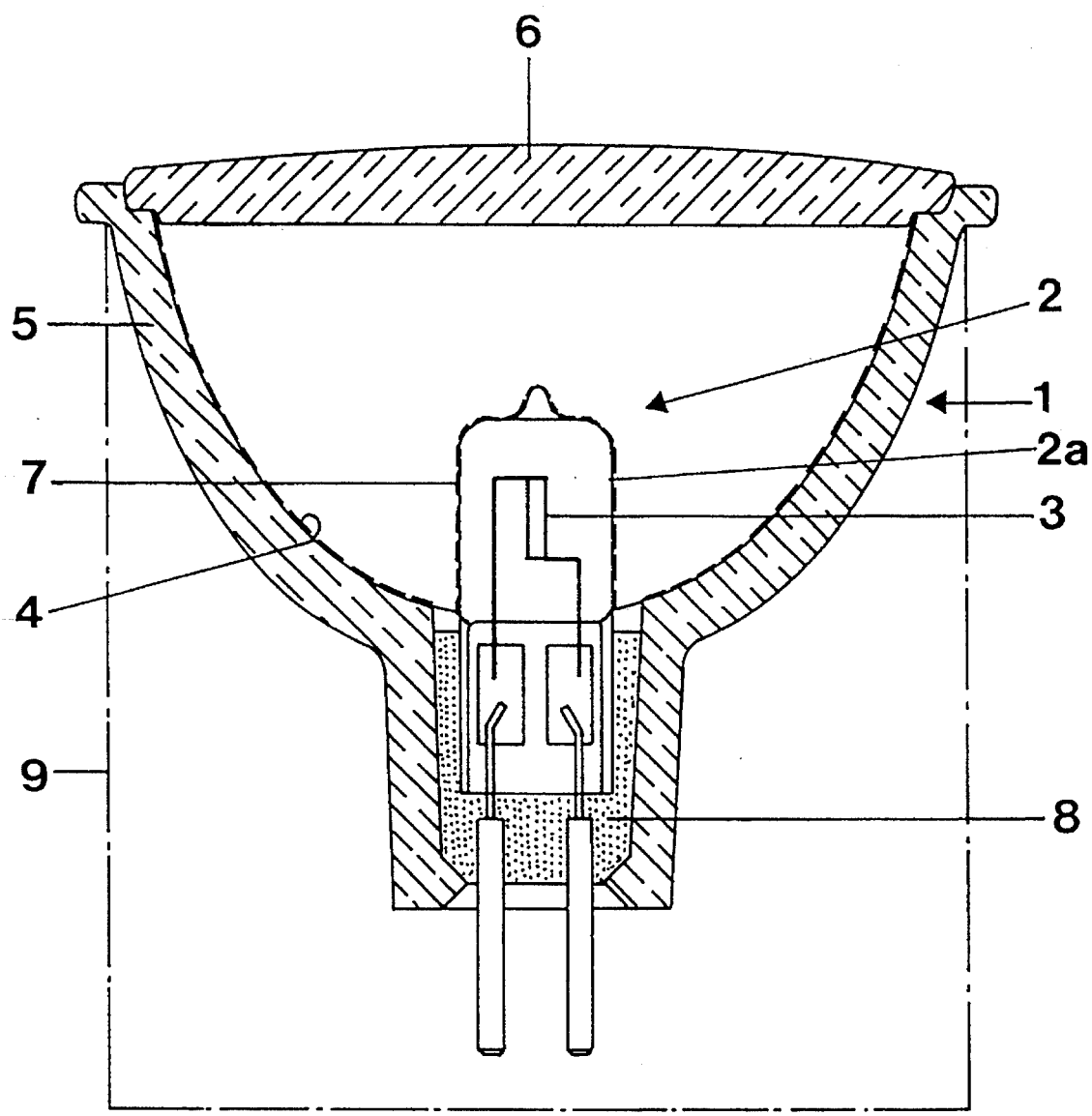
FIG. 1 is a side view, partly in section, of a reflector lamp in accordance with the invention.

Referring first to FIG. 1:

The lamp has a reflector element 1 in which a 12 V low-voltage halogen incandescent lamp 2 is secured. The lamp 2 has a nominal rating of 50 W, and it is positioned on the axis of symmetry of a rotation-symmetrical aluminum reflector 5. This aluminum reflector may either be a reflector made of solid aluminum of high purity; alternatively, it may be made of a substrate of glass which is coated with an aluminum coating 4; this is the embodiment shown. The lamp is securely retained within the reflector by a cement 8. The longitudinal axis of the halogen incandescent lamp 2 and the axis of symmetry of the reflector 5 are congruent. The filament 3 of the halogen incandescent lamp is axially located and positioned at, or close to, the focal point of the reflector 5. Since the filament 3 has a finite dimension and is not a theoretical point like a focal point, it is actually located in a surface or focal region of the reflector 5. The reflector 5 is closed with a closing disk or cover 6. The bulb 2a of the lamp 2 is a cylinder of quartz glass or hard glass.

In accordance with a feature of the invention, the bulb 2a is coated at the outside, or at the inside, or both at the outside and the inside, with an IR reflective, diffusing or dispersing or absorbing coating 7. The coating 7 may be in accordance with the Examples 1–4 above. The lamp 2 is located within a lamp housing or light fixture which is only shown schematically by chain-dotted line 9, since it may be of any suitable configuration.

FIG. 3 illustrates the spectral reflection of an aluminum reflector 5. The reflection extends, at the long wave length, to close to 4000 nm, and hence reflects the essential portion of radiation from the lamp 2. This radiation distribution is shown, highly schematically in block form, in solid lines, in FIG. 3, for comparison purposes. Of course, actually, the radiation will not be in the stepped form shown, which is merely a schematic representation.

Figure 2:
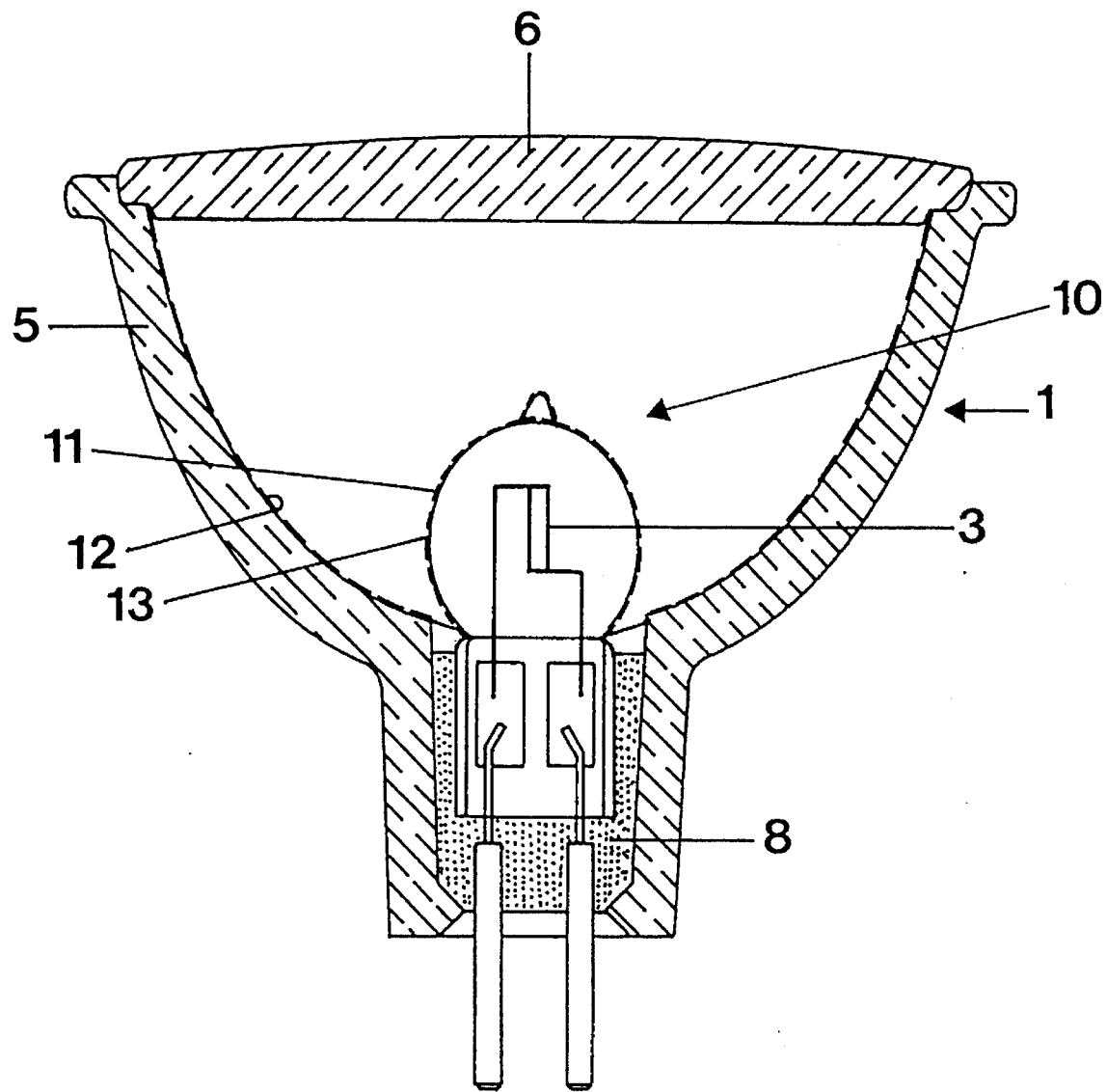
FIG. 2 is a view similar to FIG. 1 of another reflector lamp.

The lamp of FIG. 2 corresponds in all essential features to the lamp of FIG. 1; rather than using an incandescent lamp with a generally cylindrical bulb, the incandescent lamp 10 has an essentially ellipsoidal bulb 13. It is coated with an interference filter 11 having more than 20 layers of $Ta_2O_5$/$SiO_2$. This is a well known warm-light filter, transmitting radiation between about 400 and 800 nm, but reflecting radiation above 800 nm. The transmission of visible light is about 90%, and IR reflection is about 65%. The thickness of the reflective layers is roughly constant over the surface of the bulb.

The reflector 5 is formed by a substrate of glass, coated at the inside with an interference filter 12 made of $TiO_2/SiO_2$, having more than 20 layers, and acting as a wide-band mirror. It reflects in a range of wave length between about 400 and 1500 nm of more than 90%. The thickness of the respective layers may vary over the surface of the reflector. The spectral reflection is shown in FIG. 3 by the chain-dotted line. Above the limit of about 1500 nm, the contribution of IR radiation of the lamp 10 is in a tolerable order of magnitude; in other words, the radiation between about 1500 nm and 4000 nm is such that it can be partially or even completely emitted towards the rear of the lamp, that is, not through the front cover 6. If required, for example by a housing shown in broken lines 29 in FIG. 2, the design of the layers of the broad-band reflector can be so made that it is partially transmitting in the long-wave IR portion of the spectrum, for example 70% transmissive.

A further contribution of about 15% of radiation is emitted by the diffuse bulb radiation in the range of between about 4000 and 10,000 nm. Preferably, the characteristic of the bulb material itself can be used there, which absorbs radiation from about 4000 nm of the filament, and thus, within the concept of the present invention contributes additionally to diffuse IR radiation. The lamp bulb material, usually, is quartz glass or hard glass. Thus, a filter acting in the range above about 4000 nm is not needed.

Of course, the type of bulb shown in FIG. 1 may also be used in the embodiment of FIG. 2, that is, an interference filter coating may also be used in the embodiment of FIG. 1.

FIG. 3 provides a comparison of the reflection characteristics of a cold-light mirror, described in connection with the prior art, which only reflects visible portions of radiation, with the present invention.

FIG. 4 is a highly schematic representation of radiation diagrams of different reflectors. The bulbs are shown only schematically, and may, for example, be ellipsoidal, as illustrated, or cylindrical, or spherical (FIGS. 1, 2). The radiation patterns are schematic, and not to scale.

In FIG. 4, the solid line symbolizes the visible radiation; the broken lines the IR portion of emitted radiation. FIG. 4a illustrates a customary reflector lamp having an uncoated bulb and aluminum mirror. The light distribution of visible radiation and IR radiation are practically coincident. The heat loading in forward direction from the lamp is very high.

Figure 4A:
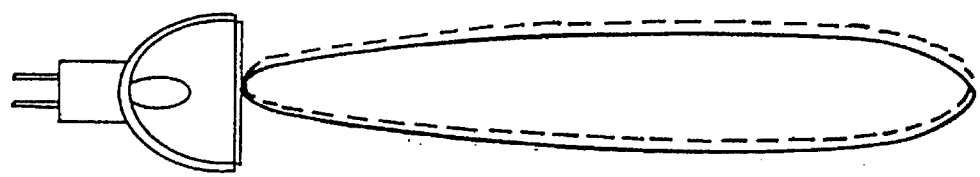
Figure 4B:
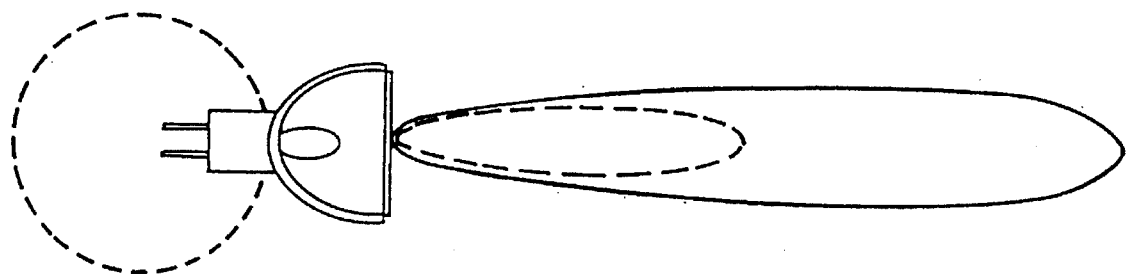

FIG. 4b illustrates a reflector lamp having a cold-light mirror (KLR) in accordance with the prior art described in the background portion of this specification. As can be clearly seen, a lamp housing or light fixture 9 (FIG. 1) or 29 (FIG. 2) surrounding the lamp would be substantially heated due to the effect of the rear-emitted IR radiation. A remaining portion of the IR radiation is projected forwardly, in a directed pattern.

Figure 4C:
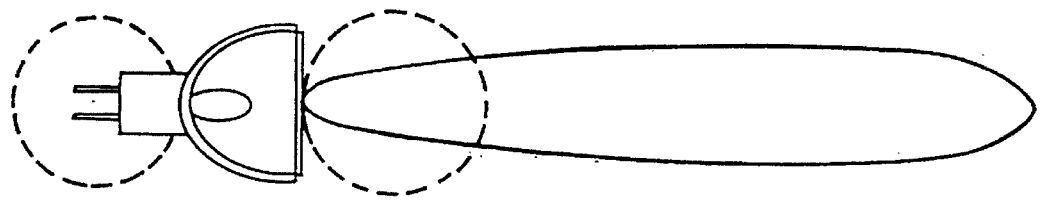

FIG. 4c illustrates one embodiment of the present invention using a reflector lamp with an infrared coating of the bulb, as well as a broad band coating of the reflector. Both coatings are interference filters. The infrared radiation is largely emitted forwardly, as shown in FIG. 4a, however, as clearly apparent from FIG. 4c, in diffuse and non-focused manner, and essentially uniformly distributed. Thus, heat loading in a small target area, to which the visible light cone is directed, is effectively avoided. The heat energy radiated—highly diffused—in the direction of the light beam, is only slightly more than that in the lamp of FIG. 4b, resulting in lower heat energy transmission rearwardly of the lamp.

Figure 4D:
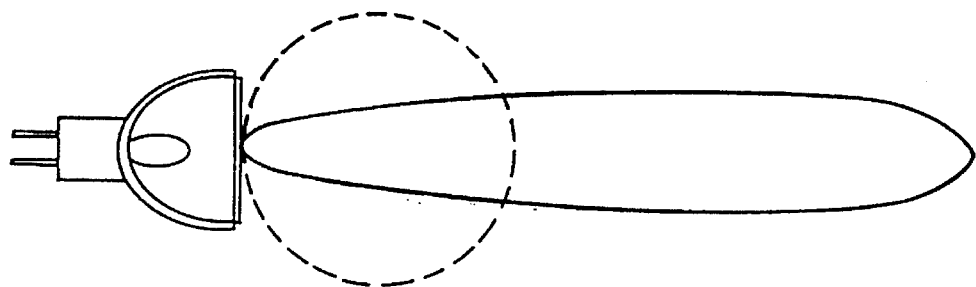

FIG. 4d illustrates another embodiment in accordance with the present invention, in which a coated halogen incandescent lamp is used together with an aluminum reflector, that is, with a reflector which has no or only very little IR radiation transmissivity. Essentially the entire IR radiation is emitted forwardly, in highly diffuse manner, again effectively eliminating heat loading at the target area of the visible light cone.

The attached table illustrates comparative measurements of different reflector lamp in a simulated lamp holder, luminaire, or lighting fixture. The following lamps were used:

(1) An aluminum reflector (ALU), with an uncoated lamp, comparable to FIG. 4a.

(2) A cold-light reflector (KLR), with an uncoated lamp.

(3) A cold-light reflector (KLR), with a coated lamp.

(4) An interference filter reflector (IF), with an infra-red reflecting interference filter coated (IRC) lamp, see FIG. 4c, and using a cylindrical lamp bulb.

(5) An interference filter reflector (IF), with an infra-red reflecting interference filter coated (IRC) lamp, using an elliptical lamp bulb.

(6) An aluminum reflector (ALU), with an infra-red reflecting interference filter coated (IRC) lamp, see FIG. 4d.

In all the foregoing lamps, except item 5, the lamp had a cylindrical bulb.

The thermal loading of the lamp was determined in forward radiation direction by the temperature rise of a blackened wooden plate supplied with a thermal sensing arrangement, spaced from the reflector by 30 cm. The rearward heat loading was determined by the temperature rise of a simulated luminaire in form of a part-spherical metal housing (see FIG. 2).

The table clearly shows the different temperatures being measured in operation of the various lamps with the various reflectors and coatings, respectively.

The table also clearly shows that the influence of an infrared coating in a lamp having a cold-light mirror reflector (KLR lamp) has only a small influence on the radiation in forward direction. However, the influence of an infrared coating (IRC) on the lamp bulb when using aluminum-coated reflectors or a solid aluminum reflector is amazing. The temperature loading in forward direction drops from about 180° C. (item 1 of the table) to about 128° C. (item 6 of the table). The rearward radiation of an uncoated KLR (cold-light reflector or mirror lamp), item 2, drops from 173° C. to 123° C. or 125° C., respectively, when using the lamps of items 5 and 6 in the table.

Excellent effects are also obtained in forward direction of radiation. The lamp of item 4 has a forwardly directed radiation of 96° C., with a tolerable rearward radiation. This, already, is in the order of magnitude or prior art KLR lamps without, however, the effect of the prior art KLR lamps of the substantial rearward radiation which, previously, was above 170° C. (items 2, 3) and has now dropped to 134° C. (example 4) and even less if an elliptical lamp bulb is used. The best results in energy saving lamps are obtained with a shaped bulb (item 5), since the IR proportion of the overall radiation is inherently less than with a cylindrical bulb. In item 5, the IR loading in forward direction drops to about 86° C., whereas the loading on the luminaire or light fixture is entirely acceptable at 123° C. This loading is within the general loading temperature of luminaires without any measures being taken to reduce projected heat (item 1, rearward heat loading 112°; item 5, rearward heat loading 123°.

The reflector, if in form of a coated substrate, can be coated with various materials. Aluminum is inexpensive; silver is also suitable.

TABLE

| Reflector and type of lamp (with end closure 6) | Backward radiation, temperature increase of a simulated luminaire t in (°C.) | Radiation in forward direction, measured according to German standad DIN VDE t in (°C.) |
|---|---|---|
| (1) ALU aluminum, uncoated cylindrical bulb lamp | 112 | 180 |
| (2) KLR cold-light mirror, uncoated cylindrical bulb lamp | 173 | 75 |
| (3) KLR cold-light mirror with infrared coated cylindrical bulb | 175 | 67 |
| (4) IF interference reflector with infrared coated cylindrical lamp | 134 | 96 |
| (5) IF interference reflector with infrared coated elliptical lamp bulb | 123 | 86 |
| (6) ALU aluminum reflector with infrared coated cylindrical lamp | 125 | 128 |

We claim:

1. A reflector lamp, having a halogen incandescent lamp (2, 10) having a filament (3) forming a source of light and radiant heat in form of infrared radiation, and a lamp bulb (2a, 13) transmitting visible light and emitting at least a portion of said radiant heat, comprising, a reflector (4) which reflects both visible light as well as at least a substantial proportion of infrared radiation, said reflector defining a lamp axis, said lamp (2, 10) being located within the reflector and having the filament (3) located in the focal area of the reflector; and means in the path of said radiant heat from the filament to the reflector (4) for so influencing the infrared radiation generated by the filament so that it is diffusely emitted from the entire surface of the bulb.

2. The lamp of claim 1, wherein the reflector comprises a metallic reflector structure.

3. The lamp of claim 1, wherein the reflector comprises a substrate having a metallic, reflective coating thereon.

4. The lamp of claim 3, wherein the metallic, reflective coating comprises a coating of aluminum.

5. The lamp of claim 1, wherein the reflector comprises a transparent substrate and a broad-band interference filter coating (12) on said substrate.

6. The lamp of claim 5, wherein the transmission of visible light radiation through the reflector's interference filter coating (12) is at least about 0.5% of the entire luminous flux within the visible light range.

7. The lamp of claim 1, wherein said influencing means comprises an interference filter coating (7, 11) applied to the lamp bulb for reflecting a major part of the infrared radiation emitted from the filament (3) into an entire space within the bulb (2a, 13), so that part of it is diffusely emitted from the bulb.

8. The lamp of claim 1, wherein the bulb (13) has a radiation-directing shape which diffuses reflective radiation throughout a space within the bulb, whereby the efficacy of the coating is enhanced.

9. The lamp of claim 8, wherein the shape of the bulb is at least approximately ellipsoidal or cylindrical.

10. The lamp of claim 1 wherein said means in the path of said radiant heat from the filament to the reflector comprises a coating formed by a plurality of coating layers, and wherein the plurality of coating layers are of effectively constant thickness over the bulb.

11. The lamp of claim 1, wherein the filament (3) is axially located within the bulb.

12. A reflector lamp, having a halogen incandescent lamp (2, 10) having a filament (3) forming a source of light and radiant heat in form of infrared radiation, and a lamp bulb (2a, 13) transmitting visible light and emitting at least a portion of said radiated heat, comprising, a reflector which reflects both visible light as well as at least a substantial proportion of infrared radiation, said reflector defining a lamp axis, said lamp (2, 10) being located within the reflector and having the filament (3) located in the focal area of the reflector; and means for influencing the infrared radiation generated by the filament so that it is diffusely emitted from the bulb, said influencing means comprising a coating on the bulb (2a, 13) which transmits radiation essentially within the visible light range directly from the filament (3) to the surface of the reflector, but reflects at least a substantial portion of infrared radiation of the filament (3) from the surface of the lamp bulb into a space within the bulb (2a, 13), whereby at least most of said substantial portion of the radiation in the infrared spectral region, reflected into said space within the bulb will be emitted from the surface of the bulb for further reflection from the reflector in diffuse, unfocused direction.

13. The lamp of claim 12, wherein the reflector comprises a metallic reflector structure.

14. The lamp of claim 12, wherein the reflector comprises a substrate having a metallic, reflective coating thereon.

15. The lamp of claim 12, wherein the reflector comprises a transparent substrate and a broad-band interference filter coating (12) on said substrate.

16. The lamp of claim 12, wherein said diffusing means comprises an interference filter coating (7, 11) applied to the lamp bulb for diffusely reflecting infrared radiation emitted from the filament (3) into an entire space within the bulb (2a, 13), so that part of it is diffusely emitted from the entire surface of the bulb.

17. The lamp of claim 16, wherein the bulb (13) has a radiation-directing shape which diffuses reflective radiation throughout a space within the bulb, whereby the efficacy of the coating is enhanced.

18. The lamp of claim 17, wherein the shape of the bulb is at least approximately ellipsoidal or cylindrical.

19. The lamp of claim 18, wherein said coating comprises a plurality of coating layers, and wherein the plurality of coating layers are of effectively constant thickness.

20. The lamp of claim 12, wherein the filament (3) is axially located within the bulb.

* * * * *